United States Patent
Blount

(10) Patent No.: US 8,800,041 B2
(45) Date of Patent: *Aug. 5, 2014

(54) ANTIVIRUS SCAN DURING A DATA SCRUB OPERATION

(75) Inventor: Lawrence Carter Blount, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/535,554

(22) Filed: Jun. 28, 2012

(65) Prior Publication Data
US 2013/0198844 A1    Aug. 1, 2013

Related U.S. Application Data

(63) Continuation of application No. 13/358,907, filed on Jan. 26, 2012.

(51) Int. Cl.
| G06F 11/00 | (2006.01) |
| G06F 12/14 | (2006.01) |
| G06F 12/16 | (2006.01) |
| G08B 23/00 | (2006.01) |

(52) U.S. Cl.
USPC ................ 726/24; 707/692; 710/20

(58) Field of Classification Search
None
See application file for complete search history.

(56) References Cited

U.S. PATENT DOCUMENTS

| 6,279,128 | B1 | 8/2001 | Arnold et al. |
| 6,851,070 | B1 * | 2/2005 | Rodrigues et al. ........... 714/5.11 |
| 7,653,838 | B2 | 1/2010 | Forrer, Jr. et al. |
| 7,665,137 | B1 | 2/2010 | Barton et al. |
| 7,698,591 | B2 | 4/2010 | Zohar et al. |
| 7,756,992 | B1 | 7/2010 | Zhao |
| 2003/0033331 | A1 * | 2/2003 | Sena et al. ..................... 707/513 |
| 2005/0036381 | A1 * | 2/2005 | Hassner et al. ............... 365/222 |
| 2005/0066254 | A1 | 3/2005 | Grainger et al. |
| 2005/0216759 | A1 | 9/2005 | Rothman et al. |
| 2008/0222734 | A1 | 9/2008 | Redlich et al. |
| 2010/0071064 | A1 | 3/2010 | Weber |
| 2011/0153571 | A1 * | 6/2011 | Walker et al. ................ 707/654 |

* cited by examiner

*Primary Examiner* — Nadia Khoshnoodi
(74) *Attorney, Agent, or Firm* — Griffiths & Seaton PLLC

(57) ABSTRACT

For an antivirus scan during a data scrub operation, an antivirus scan is concurrently performed as an overlap with the data scrub operation, wherein the data scrub operation periodically inspects and corrects memory errors.

21 Claims, 4 Drawing Sheets

ANTIVIRUS SCAN DURING A DATA SCRUB OPERATION

CROSS-REFERENCE TO RELATED APPLICATIONS

The present application is a Continuation of U.S. patent application Ser. No. 13/358,907, filed Jan. 26, 2012.

BACKGROUND OF THE INVENTION

1. Field of the Invention

The present invention relates generally to computers, and more particularly, to performing an antivirus scan during a data scrub operation in a computing environment.

2. Description of the Related Art

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. Data within a storage system may become corrupted with errors and viruses within the storage system. A need exists for simultaneously determining data errors while performing antivirus scans on data.

SUMMARY OF THE DESCRIBED EMBODIMENTS

Processing very large amounts of information and data occurring in the storage system is a key problem to solve. Data processing systems are often arranged with redundant data storage in order to permit recovery of lost data, for example, from damaged media. Simultaneously, as new data is written to the data storage system, it is critical to perform an antivirus scan and therefore, a need exists for performing an antivirus scan during a data scrub operation.

Accordingly, and in view of the foregoing, various exemplary method embodiments for an antivirus scan during a data scrub operation are provided. In one embodiment, by way of example only, an antivirus scan is concurrently performed as an overlap with the data scrub operation, wherein the data scrub operation periodically inspects and corrects memory errors.

In addition to the foregoing exemplary method embodiment, other exemplary embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF CERTAIN EMBODIMENTS

As mentioned previously, with increasing demand for faster, more powerful and more efficient ways to store information, optimization of storage technologies is becoming a key challenge. In order to address the challenges of data corruption, errors, and computer software viruses, data processing systems may be arranged with redundant data storage in order to permit recovery of lost data, for example, from damaged media. RAID (Redundant Array of Independent Disks) controllers may initiate background read operations on attached hard drives in order to find locations on the media that may have been damaged, causing either hard data errors or recoverable data errors that require significant levels of Error Recovery. This process may be referred to throughout the description as a data scrub operation (e.g., data scrubbing). If a hard error is encountered during data scrubbing, the bad Logical Block Address (LBA) may be reassigned and when the drive is a member of a RAID configuration (other than RAID 0), any lost data can be recreated and rewritten. In addition, the Raid arrays may be implemented with the data scrub to verify all strides of arrays are valid.

Data scrubbing tasks may be performed to locate drives that are starting to fail and then fail the located drives before multiple failures cause raid algorithms to be prevented from rebuilding the data. In addition, an Antivirus application programming interface (API) may be included for scanning of new data as it is being written in order to capture any existing virus' that may be present during a write operation and that may can be found before user access for a read operation. However, one problem that exists for real-time scanning is that there may be large server CPU requirements host delays caused by processing time. Thus, the mechanisms of the present invention concurrently perform the anti virus scan that is to be done at the same time as the data scrub (e.g., background scrub tasks). In so doing, a continuous scanning for virus's while not impacting host input/output (IO) is accomplished. The data scrubs may occur in a 4 to 8 days range so new virus checking may be regularly executed.

Figure 1:
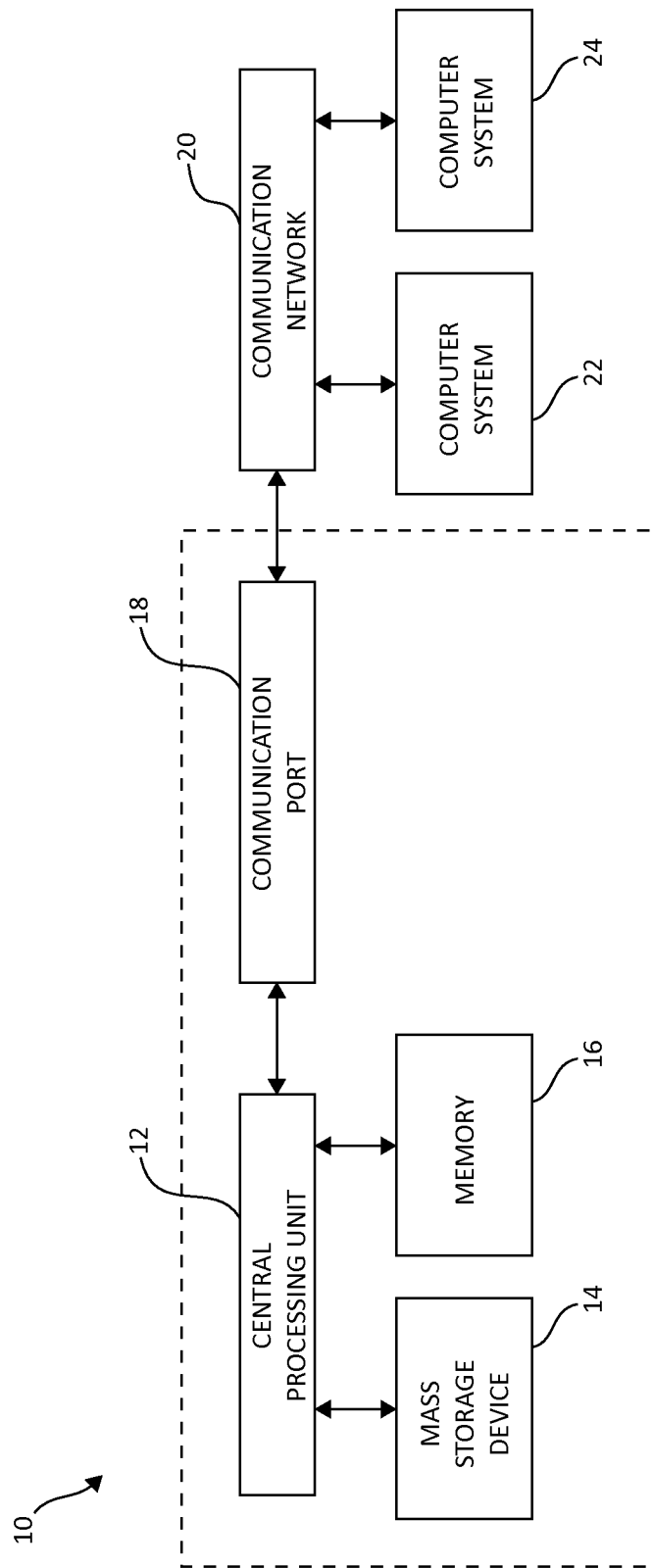
FIG. 1 illustrates a computer storage environment having an example storage device in which aspects of the present invention may be realized.

Turning to FIG. 1, an example computer system 10 is depicted in which aspects of the present invention may be realized. Computer system 10 includes central processing unit (CPU) 12, which is connected to mass storage device(s) 14 and memory device 16. Mass storage devices may include hard disk drive (HDD) devices, which may be configured in a redundant array of independent disks (RAID). Memory device 16 may include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24. The computer system 10 may include one or more processor devices (e.g., CPU 12) and additional memory devices 16 for each individual component of the computer system 10.

Figure 2:
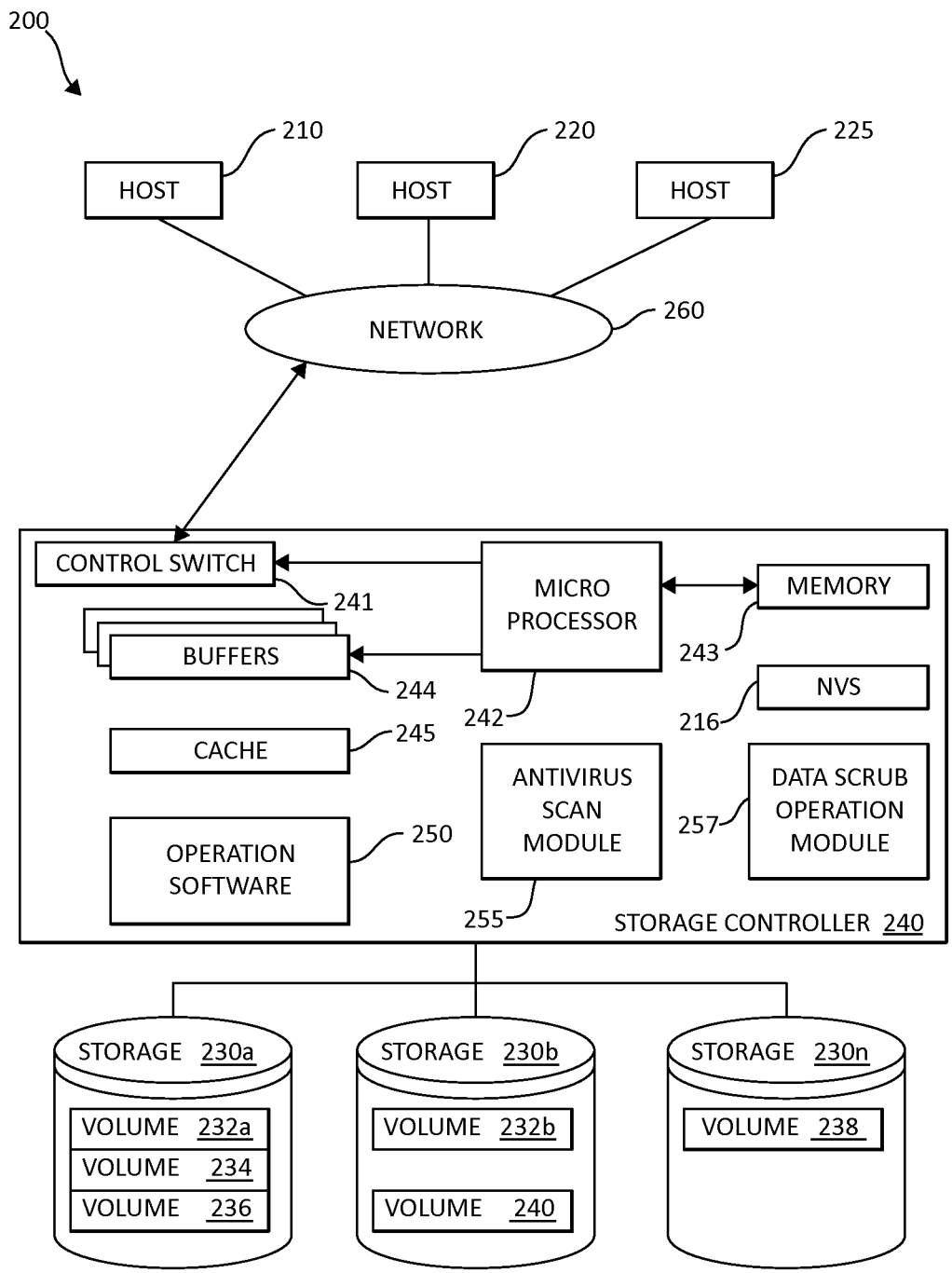
FIG. 2 illustrates an exemplary block diagram showing a hardware structure of a data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. A Network (e.g., storage fabric) connection 260 may be a fibre channel fabric, a fibre channel point-to-point link, a fibre channel over ethernet fabric or point to point link, a FICON or ESCON I/O interface. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Moreover, given the use of the storage fabric network connection 260, additional architectural configurations may be employed by using the storage fabric 260 to connect multiple storage controllers 240 together with one or more cluster hosts 210, 220, and 225 connected to each storage controller 240.

In some embodiments, the system memory 243 of storage controller 240 includes operation software 250 and stores program instructions and data which the processor 242 may access for executing functions and method steps associated with executing the steps and methods of the present invention. As shown in FIG. 2, system memory 243 may also include or be in communication with a cache 245, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 may be implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution as described in other figures. The NVS 216, may also be referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

The storage controller 240 may include an antivirus scan module 255 and a data scrub operation module 257. The antivirus scan module 255 and a data scrub operation module 257 may be one complete module functioning simultaneously or separate modules. The antivirus scan module 255 and a data scrub operation module 257 may have some internal memory (not shown) in which the compression algorithm may store unprocessed, processed, or "semi-processed" data. The antivirus scan module 255 and the data scrub operation module 257 may work in conjunction with each and every component of the storage controller 240, the hosts 210, 220, 225, and other storage controllers 240 and hosts 210, 220, and 225 that may be remotely connected via the storage fabric 260. Both the antivirus scan module 255 and the data scrub operation module 257 may be structurally one complete module or may be associated and/or included with other individual modules. The antivirus scan module 255 and the data scrub operation module 257 may also be located in the cache 245 or other components of the storage controller 240.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, cache 245 for temporarily storing (buffering) data, and buffers 244 for assisting the cache 245 to read and write data, a control switch 241 for controlling a protocol to control data transfer to or from the antivirus scan module 255 and the data scrub operation module 257 in which information may be set. Multiple buffers 244 may be implemented to assist with the methods and steps as described herein.

In one embodiment, the cluster hosts/nodes, 210, 220, 225 and the storage controller 240 are connected through a network adaptor (this could be a fibre channel) 260 as an interface i.e., via a switch called "fabric." In one embodiment, the operation of the system shown in FIG. 2 may be described as follows. The microprocessor 242 may control the memory 243 to store command information from the cluster host/node device (physical or virtual) 210 and information for identifying the cluster host/node device (physical or virtual) 210. The control switch 241, the buffers 244, the cache 245, the operating software 250, the microprocessor 242, memory 243, NVS 216, antivirus scan module 255 and the data scrub operation module 257 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

Figure 3:
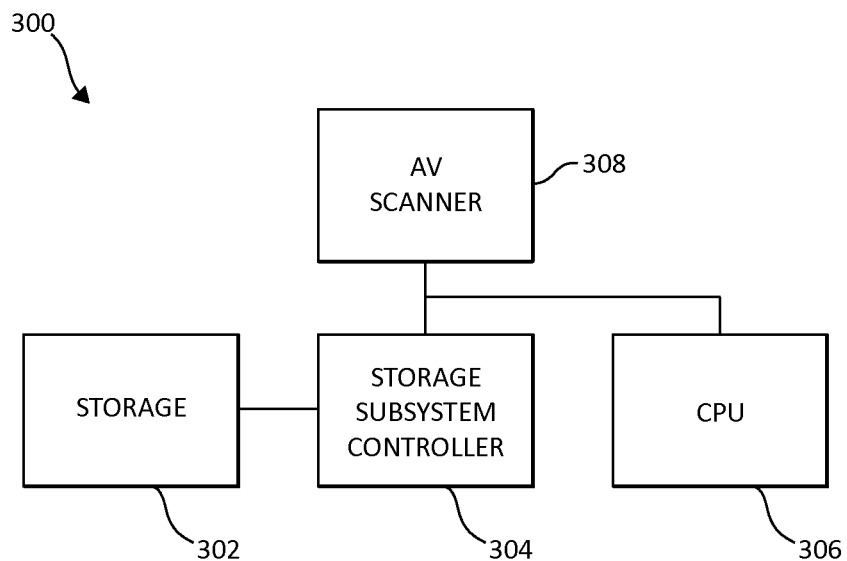
FIG. 3 illustrates a computing environment having an example antivirus scanning device in which aspects of the present invention may be realized.

FIG. 3 illustrates a computing environment having an example antivirus scanning module in which aspects of the present invention may be realized. As shown, included may be a storage 302 for saving data therein. In one embodiment, the storage 302 may include a hard drive, compact disc-read only memory (CD-ROM), a floppy disk, and/or any other type of device capable of storing data. Attached and coupled to the storage 302 may be a storage subsystem controller 304 for controlling access, i.e. read, writes, etc., to the storage 302. The storage system may be configured in a RAID formation. It should be noted that the storage subsystem controller 304 may take any form including hardware, software or any other type of logic. A central processing unit 306 (CPU) may be coupled to the storage subsystem controller 304 for issuing read requests to read the data saved in the storage 302 for processing purposes. It should be noted that multiple CPU's may be implemented and configured for accomplishing the purposes of the present invention. The central processing unit 304 further issues write requests for writing data to the storage 302. At least one antivirus scanning module 308 may be coupled to the central processing unit 306 and the storage subsystem controller 304. In one embodiment, the antivirus scanning module 308 may be coupled to the storage subsystem controller 304 and the central processing unit 306 via a bus 310. As an option, the antivirus scanning module 308 may be directly coupled to the storage subsystem controller 304. In such embodiment, a plug-in (not shown) may be included for interfacing with the storage subsystem controller 304. In still another embodiment, the antivirus scanning module 308 may be integral with the storage 302 and/or the storage subsystem controller 304. Still yet, the storage 302 may be accessible via a network (see FIG. 2).

In use, the antivirus scanning module 308 may be adapted for concurrently performing the antivirus scan as an overlap with the data scrub operation, wherein the data scrub operation periodically inspects and corrects memory errors. For example, the antivirus scanning module 308 may be capable of virus and/or content scanning for malicious code. In particular, such virus scanning may include a search for viruses, worms, and Trojan horses. Further, the content scanning may serve to detect harassing or malicious content, junk e-mails, misinformation (virus hoaxes), etc. Based on results of such scanning by the antivirus scanning module 308, the central processing unit 306 may conditionally allowed to read the data saved in the storage 302 and write data to the storage 302. In particular, access to the storage 302 may be precluded if any malicious code is found in the data to be read or written. Further, various alerts may be generated based on the results of the scanning.

Figure 4:
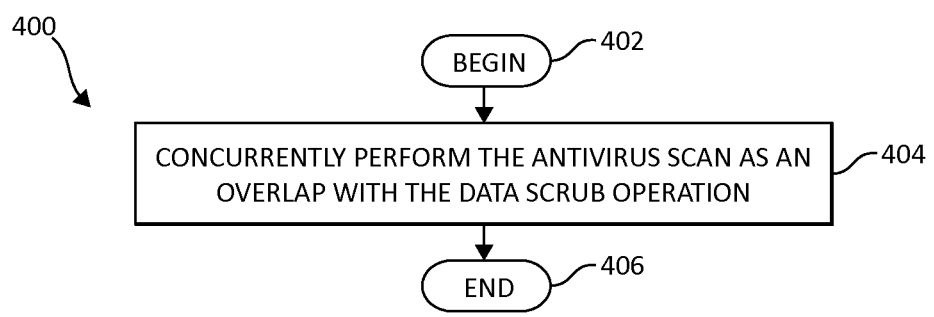
FIG. 4 is a flowchart illustrating an exemplary method for an antivirus scan during a data scrub.

FIG. 4 is a flowchart 400 illustrating an exemplary method for an antivirus scan during a data scrub. The method 400 begins (step 402). The method 400 concurrently performs the antivirus scan as an overlap with the data scrub operation (step 404). The method ends (step 406).

Figure 5:
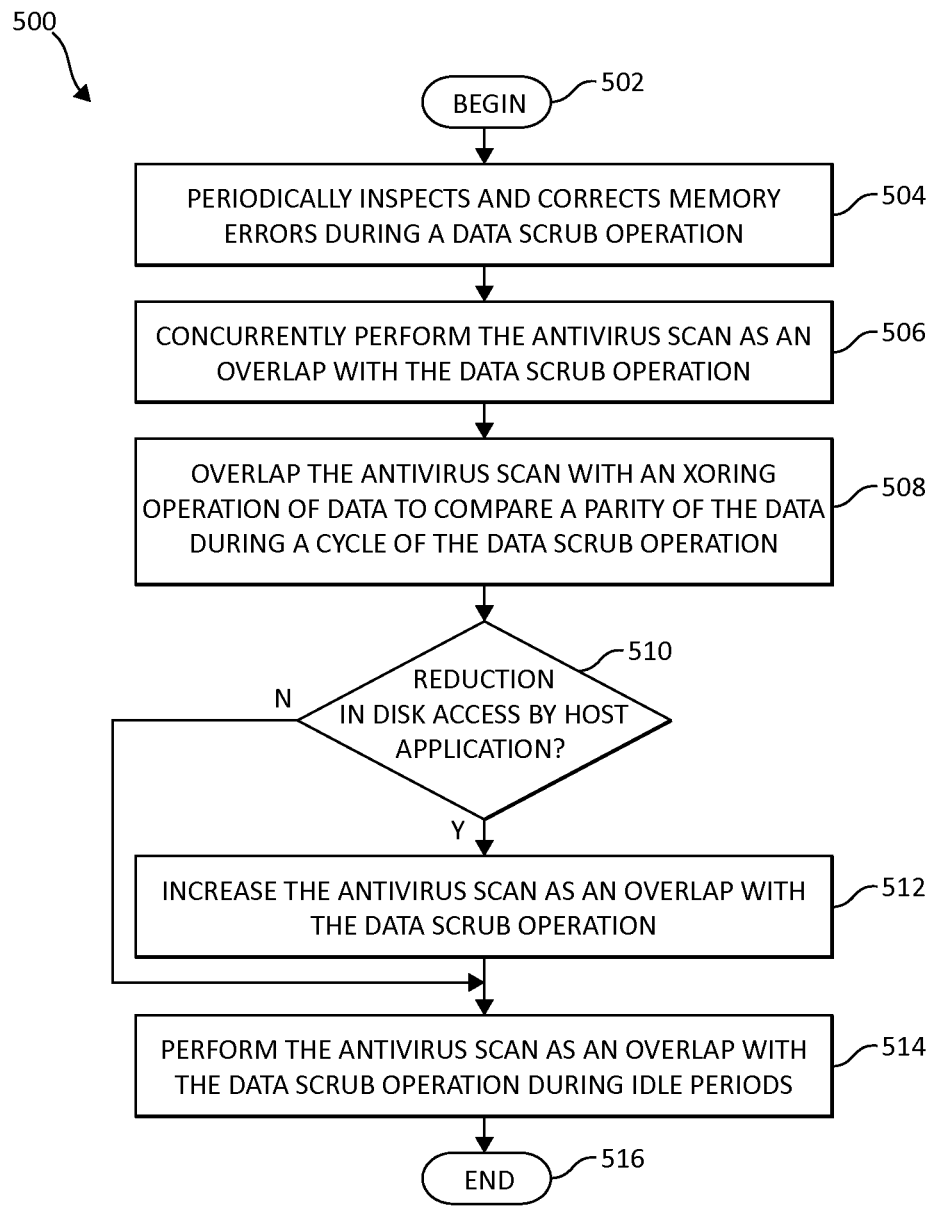
FIG. 5 is a flowchart illustrating an exemplary method for concurrently performing the antivirus scan as an overlap with the data scrub operation.

Turning to FIG. 5, a flowchart illustrating an exemplary method for concurrently performing the antivirus scan as an overlap with the data scrub operation is depicted. The method 500 begins (step 502). The method periodically inspects and corrects memory errors during a data scrub operation (step 504). The antivirus scan is concurrently performed as an overlap with the data scrub operation (step 506). For example, the method 500 may concurrently perform the antivirus scan upon detecting an uncorrectable data error during a background task of the data scrub operation. Also, it should be noted that the antivirus scan may be performed by the method 500 as an overlap with the data scrub operation in a data storage system configured with a redundant array of independent disks (RAID). The antivirus scan is overlapped with an XORing operation of data to compare a parity of the data during a cycle of the data scrub operation (step 508). If a reduction in disk access by host application is detected (step 510), the method 500 may increase the antivirus scan as an overlap with the data scrub operation (step 512). If no reduction in disk access is detected, the method 500 may perform the antivirus scan as an overlap with the data scrub operation during idle periods (step 514). The method 500 ends.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for an antivirus scan during a data scrub operation by a processor device in a computing environment, the method comprising:
concurrently performing the antivirus scan as an overlap with the data scrub operation, wherein the data scrub operation periodically inspects and corrects memory errors,
increasing the antivirus scan concurrently performing as an overlap with the data scrub operation if a reduction in disk access by a host application is detected, and
reducing a number of antivirus scan input/output (I/O) operations and data scrub I/O operations while allowing for an increased number of host input/output (I/O) operations from a host while concurrently performing the antivirus scan with the data scrub operation.

2. The method of claim 1, further including, performing the antivirus scan as an overlap with the data scrub operation in a data storage system configured with a redundant array of independent disks (RAID).

3. The method of claim 1, further including, in conjunction with the performing, overlapping the antivirus scan with an XORing operation of data to compare a parity of the data during a cycle of the data scrub operation.

4. The method of claim 1, further including, concurrently performing the antivirus scan upon detecting an uncorrectable data error during a background task of the data scrub operation.

5. The method of claim 1, wherein the antivirus scan and data scrub operation are performed during idle time.

6. The method of claim 1, further including, increasing the performing the antivirus scan as an overlap with the data scrub operation during periods of a reduction in disk access by a host application.

7. The method of claim 1, wherein the antivirus scan includes performing at least one of scanning data for malicious code, virus scanning, and content scanning.

8. A system for an antivirus scan during a data scrub operation in a computing environment, the system comprising:
a processor device operable in the computing environment, wherein the processor device is adapted for:
concurrently performing the antivirus scan as an overlap with the data scrub operation, wherein the data scrub operation periodically inspects and corrects memory errors,
increasing the antivirus scan concurrently performing as an overlap with the data scrub operation if a reduction in disk access by a host application is detected, and
reducing a number of antivirus scan input/output (I/O) operations and data scrub I/O operations while allowing for an increased number of host input/output (I/O) operations from a host while concurrently performing the antivirus scan with the data scrub operation.

9. The system of claim 8, wherein the processor device is further adapted for performing the antivirus scan as an overlap with the data scrub operation in a data storage system configured with a redundant array of independent disks (RAID).

10. The system of claim 8, wherein the processor device is further adapted for, in conjunction with the performing, overlapping the antivirus scan with an XORing operation of data to compare a parity of the data during a cycle of the data scrub operation.

11. The system of claim 8, wherein the processor device is further adapted for, concurrently performing the antivirus scan upon detecting an uncorrectable data error during a background task of the data scrub operation.

12. The system of claim 8, wherein the antivirus scan and data scrub operation are performed during idle time.

13. The system of claim 8, wherein the processor device is further adapted for increasing the performing the antivirus scan as an overlap with the data scrub operation during periods of a reduction in disk access by a host application.

14. The system of claim 8, wherein the antivirus scan includes performing at least one of scanning data for malicious code, virus scanning, and content scanning.

15. A computer program product an antivirus scan during a data scrub operation in a computing environment, the computer program product comprising a non-transitory computer-readable storage medium having computer-readable program code portions stored therein, the computer-readable program code portions comprising:
a first executable portion concurrently performing the antivirus scan as an overlap with the data scrub operation, wherein the data scrub operation periodically inspects and corrects memory errors;

a second executable portion increasing the antivirus scan concurrently performing as an overlap with the data scrub operation if a reduction in disk access by a host application is detected, and a third executable portion reducing a number of antivirus scan input/output (I/O) operations and data scrub I/O operations while allowing for an increased number of host input/output (I/O) operations from a host while concurrently performing the antivirus scan with the data scrub operation.

16. The computer program product of claim 15, further including a fourth executable portion for performing the antivirus scan as an overlap with the data scrub operation in a data storage system configured with a redundant array of independent disks (RAID).

17. The computer program product of claim 15, further including a fourth executable portion for, in conjunction with the performing, overlapping the antivirus scan with an XOR-ing operation of data to compare a parity of the data during a cycle of the data scrub operation.

18. The computer program product of claim 15, further including a fourth executable portion for concurrently performing the antivirus scan upon detecting an uncorrectable data error during a background task of the data scrub operation.

19. The computer program product of claim 15, wherein the antivirus scan and data scrub operation are performed during idle time.

20. The computer program product of claim 15, further including a fourth executable portion for increasing the performing the antivirus scan as an overlap with the data scrub operation during periods of a reduction in disk access by a host application.

21. The computer program product of claim 15, wherein the antivirus scan includes performing at least one of scanning data for malicious code, virus scanning, and content scanning.

* * * * *